No. 696,847. Patented Apr. 1, 1902.
A. SPENCER.
VACUUM AND WATER RELIEF VALVE APPARATUS FOR LOCOMOTIVES.
(Application filed Sept. 30, 1901.)
(No Model.) 4 Sheets—Sheet I.

Witnesses.
Geo. E. Frech
Alice W. Hoffman

Inventor.
A. Spencer,
by A. S. Pattison,
atty.

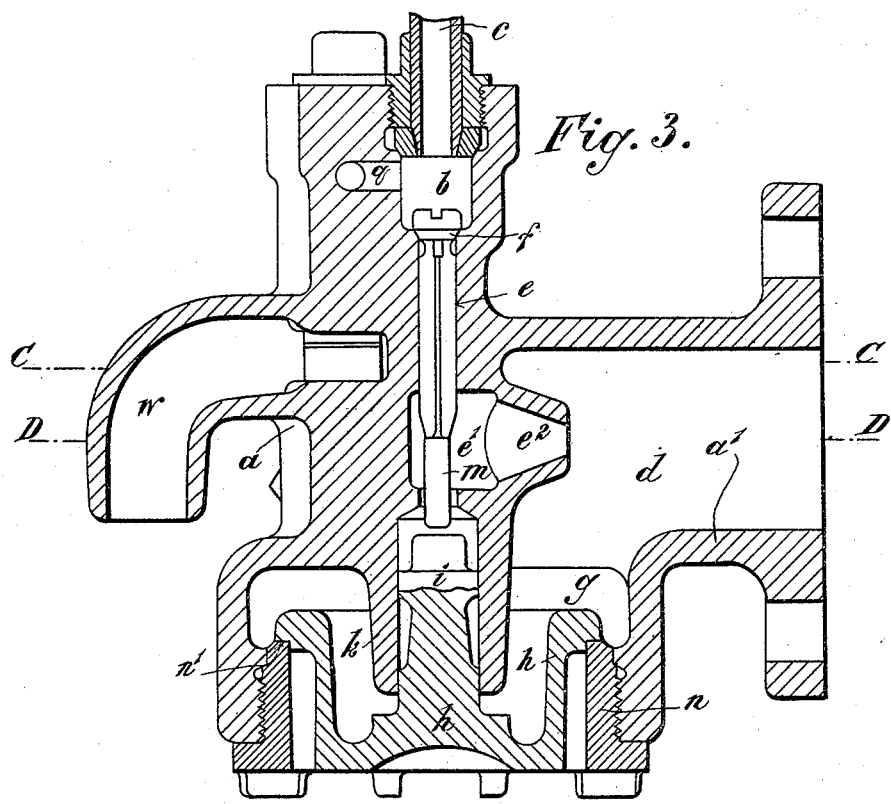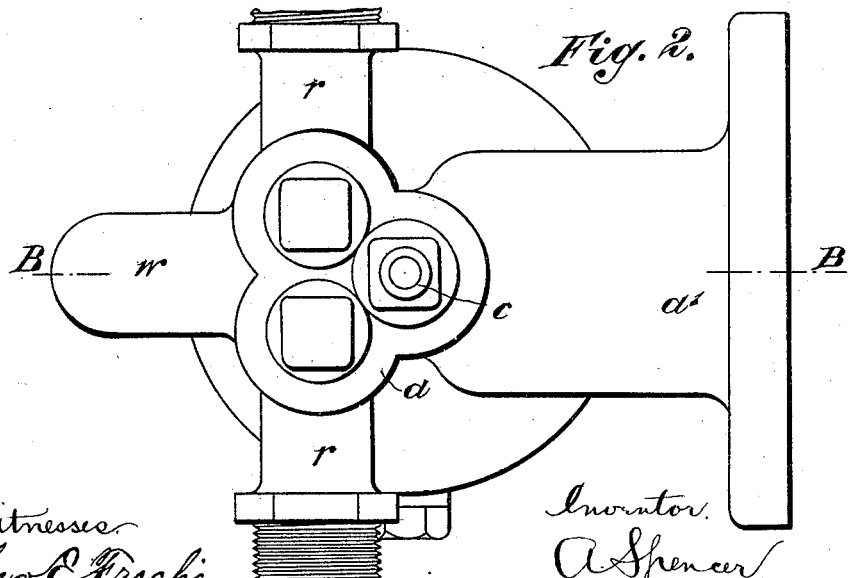

No. 696,847. Patented Apr. 1, 1902.
A. SPENCER.
VACUUM AND WATER RELIEF VALVE APPARATUS FOR LOCOMOTIVES.
(Application filed Sept. 30, 1901.)
(No Model.) 4 Sheets—Sheet 3.

Witnesses
Geo. E. Frech.
Alice W. Hoffman

Inventor
A. Spencer,
by A. S. Pattison,
Atty.

No. 696,847. Patented Apr. 1, 1902.
A. SPENCER.
VACUUM AND WATER RELIEF VALVE APPARATUS FOR LOCOMOTIVES.
(Application filed Sept. 30, 1901.)
(No Model.) 4 Sheets—Sheet 4.

UNITED STATES PATENT OFFICE.

ALEXANDER SPENCER, OF LONDON, ENGLAND.

VACUUM AND WATER RELIEF VALVE APPARATUS FOR LOCOMOTIVES.

SPECIFICATION forming part of Letters Patent No. 696,847, dated April 1, 1902.

Application filed September 30, 1901. Serial No. 77,111. (No model.)

*To all whom it may concern:*

Be it known that I, ALEXANDER SPENCER, a subject of the King of Great Britain and Ireland, residing at London, England, have invented Improvements in Vacuum and Water Relief Valve Apparatus for Locomotive and other Like Engines, of which the following is a specification.

This invention has reference to improved constructions of valve apparatus for use with locomotive and other like engines whereby upon a partial vacuum being set up in the cylinders of such an engine by cutting off the main supply of steam thereto while the engine is being propelled by gravity or by its own momentum air and steam at or near atmospheric pressure will be automatically admitted to such cylinders, either direct or through their steam-chests, so as to destroy the partial vacuum in the cylinders and so prevent undue strains being set up in the piston-rods and their connections when the engine is running under the conditions mentioned and whereby water of condensation trapped within the cylinders can under the pressure of the pistons working therein be readily allowed to escape into the atmosphere.

The invention consists for these purposes in novel features of construction and in combinations and arrangements of parts, all as hereinafter described, and particularly pointed out in the claims.

Figure 1:
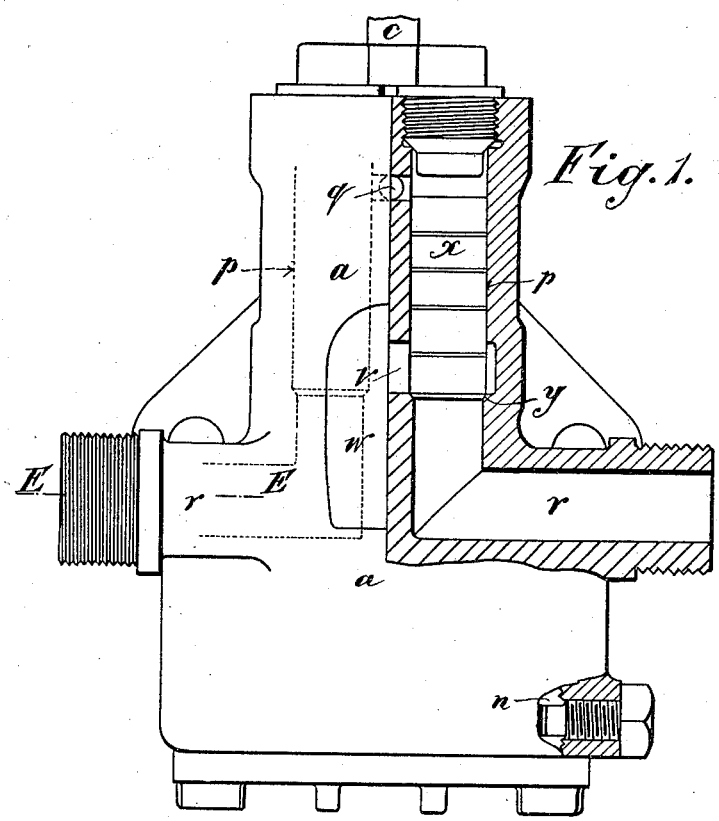
Figure 4:
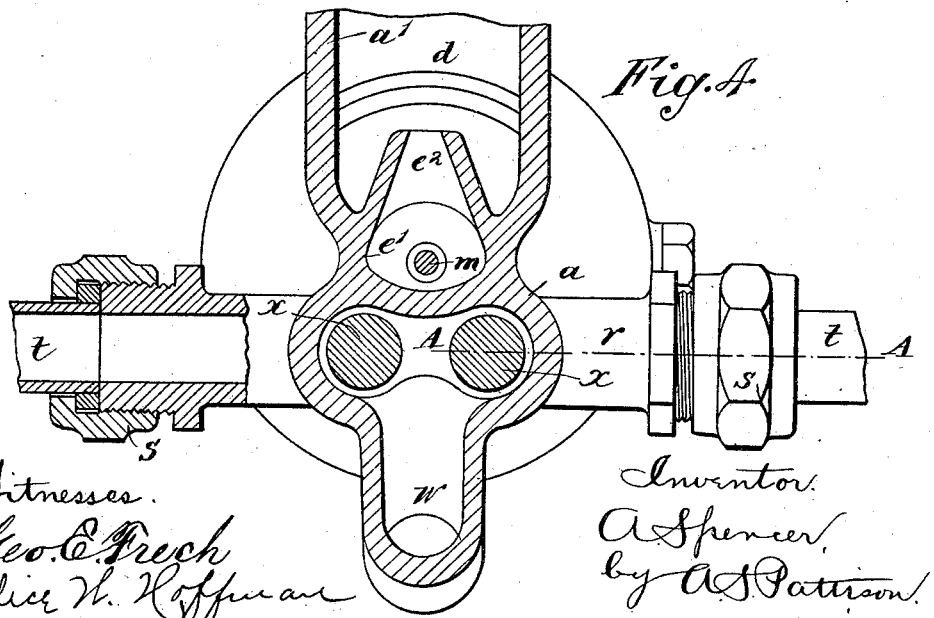
Figure 5:
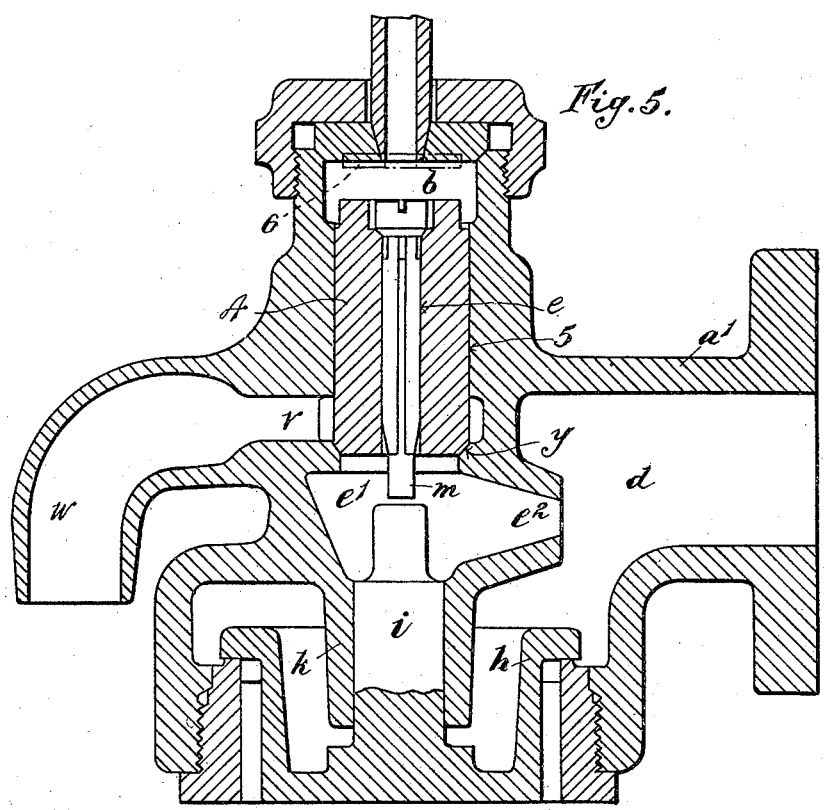

In the accompanying illustrative drawings, Figure 1 shows, partly in elevation and partly in vertical section on the line A A of Fig. 4, and Fig. 2 in plan, one construction of valve apparatus according to this invention. Fig. 3 is a vertical section on the line B B of Fig. 2. Fig. 4 is a horizontal section, partly on the line C C of Fig. 3, partly on the line D D of Fig. 3, and partly on the line E E of Fig. 1. Fig. 5 is a similar view to Fig. 3, showing a modified construction. Figs. 6 to 9, inclusive, are diagrams showing different ways in which the valve apparatus can be applied to the cylinders of a locomotive-engine.

The valve apparatus shown in Figs. 1 to 4, inclusive, comprises a casing $a$, provided with a branch $a'$, by which it can be connected to the steam chest or cylinder of the engine with which the said valve apparatus is to be used. The upper portion of the casing is formed with a steam-supply chamber $b$, that is adapted to be connected by a pipe $c$ to the boiler from which steam is supplied to the engine with which the valve apparatus is used. The branch $a'$ is formed with a vacuum-relief passage $d$, that will be in communication with the engine cylinder or cylinders or steam-chest when the valve-casing is fixed in position for use and which can be placed in connection with the steam-supply chamber $b$ through a connecting-passage $e$, that is formed in the casing $a$ and is controlled by a small steam-valve $f$, the said passage having an enlarged portion or chamber $e'$ and terminating at its delivery end in a nozzle $e^2$, through which the steam admitted past the valve $f$ will issue in the form of a jet into the vacuum-relief passage $d$. The lower end of the casing $a$ is provided with an air-inlet passage $g$, that is adapted to be placed in communication with the vacuum-relief passage $d$ and is controlled by an air-inlet valve $h$, that opens inward. This air-inlet valve is provided on its inner side with a central stem $i$, that extends into and is adapted to work in a guide $k$, into which extends the lower end of the stem $m$ of the steam-inlet valve $f$. The air-inlet valve $h$ is made of such an area that when a partial vacuum is set up in the passage $d$, as hereinbefore described, the total pressure of the external atmosphere on the said air-valve will be sufficient to overcome the total pressure of the steam in the chamber $b$ on the small steam-valve $f$. $n$ is bush screwed into the opening through the bottom of the valve-case $a$, the opening through such bush serving as the air-inlet passage $g$, and the inner end of such bush forming an annular valve-seat $n'$ for the air-relief valve $h$. The valve-casing $a$ is also formed with two vertically-arranged valve-chambers $p$, the upper ends of which are in constant communication with the steam-chamber $b$ through suitable passages $q$ and the lower ends of which are connected to the inner ends of two separate horizontal water-exit passages $r$, the outer ends of which are adapted to be connected, as by screw-unions $s$ and connecting-pipes $t$, to one end of each of the two engine-cylinders $u$ (see Fig. 6) or to the two ends of one of the said cylinders, as hereinafter described.

Each of the vertical valve-chambers $p$ has a water-exit port or passage $v$ in its wall communicating with a common water-discharge spout $w$ and is provided with a vertically-movable plain cylindrical water-relief valve $x$, the upper end of which is constantly subjected to the pressure of steam and the lower end of which is normally closed against an annular seat $y$, formed by slightly reducing the bore of the lower end of the chamber $p$ at a part below the water-exit port or passage $v$, the effective lower end of the valve when closed and subject to pressure being thus smaller than the upper end.

When the apparatus is in use and the locomotive or like engine to which it is applied is running under steam, the steam-admission valve $f$ and water-relief valves $x$ will be held closed by the pressure upon their upper ends of the steam admitted through the steam-pipe $c$ to the steam-chamber $b$, and the air-inlet valve $h$ will be held closed by the pressure of steam in the vacuum-relief passage $d$. When a partial vacuum is set up in the engine-cylinders $u$, to which the vacuum-relief passage $d$ is connected, the air-admission valve $h$ will be raised and opened by the pressure against it of the external atmosphere, and thereby admit air to the vacuum-relief passage $d$. The opening of the air-valve $h$ causes the stem $i$ thereon to abut against and raise the stem $m$ of the steam-admission valve $f$, thereby opening this valve and allowing a small quantity of steam to flow from the steam-supply pipe $c$ and chamber $b$ into the connecting-passage $e$, whence it will issue through the nozzle end $e^2$ thereof into the vacuum-relief passage $d$ and become mixed with the air entering through the open air-passage $g$, the hot mixture of air and steam entering the engine-cylinders $u$ at a pressure very slightly if at all above atmospheric pressure, thus destroying the partial vacuum set up in the cylinders and preventing its being again formed while the engine is running with the main supply of steam cut off therefrom, the said mixture at the same time serving to wet or lubricate the cylinder and valves. When water of condensation accumulates to a sufficient extent in either end of the cylinder or cylinders to which the passages $r$ are connected, it will be ejected therefrom through the pipe $u$, connected to such cylinder end, into the corresponding water-relief passage $r$, where when the motion of the engine-piston causes the water-pressure to exceed the boiler-pressure it will act upon the under side of the corresponding water-relief valve $x$, so as to raise that valve and escape through the water-exit port or passage $v$ and spout $w$.

Figure 6:
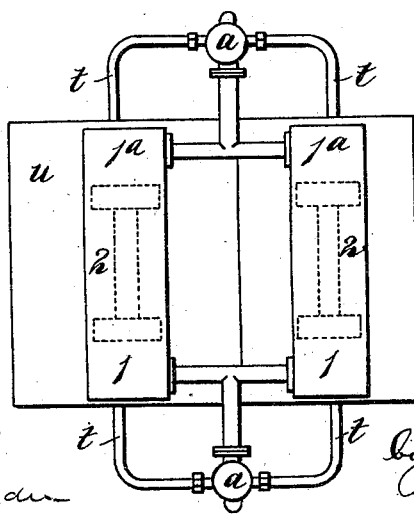
Figure 7:
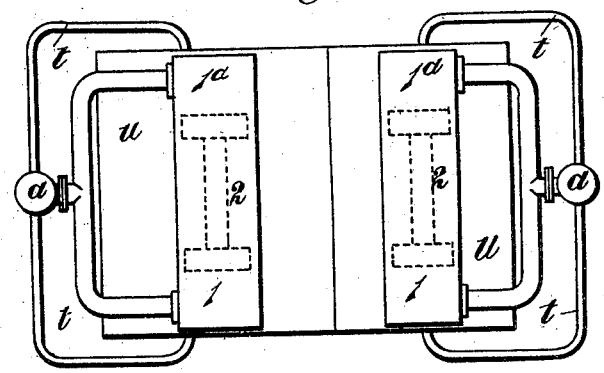
Figure 8:
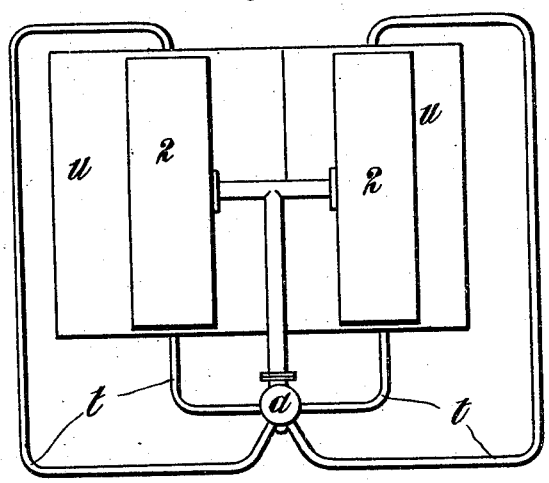

For a two-cylinder locomotive-engine having piston steam-distributing valves two valve apparatus of the kind hereinbefore described may be used, as shown in Fig. 6, one apparatus having its vacuum-relief passage $d$ in connection with the steam-supply chambers 1 at the corresponding ends of the two valve-chests 2 and its water-relief passages $r$ in connection by the pipes $t$ with the corresponding ends of the two cylinders $u$, the second apparatus having its vacuum-relief passage $d$ similarly connected to the steam-supply chambers $1^a$ at the opposite end of the two steam-chests and its water-relief passages $r$ in connection with the opposite ends of the two cylinders, or, as shown in Fig. 7, each valve apparatus may have its vacuum-relief passage $d$ connected to each of the steam-supply chambers 1 $1^a$ of one steam-chest and its two water-relief passages $r$ connected to the opposite ends of the corresponding engine-cylinder.

Instead of using two valve apparatus such as described for a two-cylinder engine, one valve apparatus only may in some cases be employed—as, for example, when the engine-cylinders have steam-chests provided with ordinary D-valves. In this case (see Fig. 8) the vacuum-relief passage $d$ of the apparatus is placed in communication with the two steam-chests 3, and the water-relief passages $r$, of which four are then necessary, are connected by pipes $t$ to the respective ends of the two engine-cylinders $u$.

Fig. 5 shows a modified construction of combined automatic valve apparatus according to this invention, wherein the connecting-passage $e$, between the steam-inlet passage $c$ and chamber $b$ and the vacuum-relief passage $d$ and in which the small steam-inlet valve $f$, with its stem $m$, works, is formed in a cylindrical plug 4, that serves as a water-relief valve. This valve is arranged to work steam-tight in a vertical chamber 5, directly above and in communication with which is the steam-supply chamber $b$ and below and in communication with which is the chamber $e'$, formed with the steam-exit nozzle $e^2$, through which steam admitted by the opening of the steam-valve $f$ issues into the vacuum-relief passage $d$. The lower end of the valve-chamber 5 is contracted to form an annular seat $y$ for the water-relief valve 4, so that the upper end of such valve, which is constantly exposed to steam-pressure, will be larger than the effective area of the lower end of the valve exposed to the pressure of steam coming from the engine-cylinder, to which the vacuum-relief passage is connected. Above the said annular valve-seat the guide-chamber is formed with a lateral water-exit port $v$, that communicates with the external atmosphere through a suitably-arranged discharge-spout $w$. In this case water of condensation enters the apparatus from the engine-cylinder through the vacuum-relief passage $d$, which thus also serves as a water-relief passage, the said water passing through the nozzle $e^2$ into the lower chamber $e'$ and by acting upon the under side of the water-relief valve 4 raising that valve and so uncovering the water-exit port $v$, through which it escapes. The apparatus acts like that hereinbefore described with reference to and shown in Figs. 1 to 4, inclusive, for destroying and afterward preventing a partial vacuum in the engine-cylinder.

Figure 9:
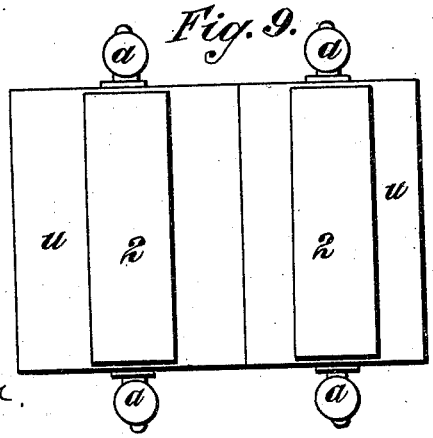

For a two-cylinder locomotive-engine having piston-distributing valves four valve apparatus of the kind shown in Fig. 5 would be necessary, as indicated in Fig. 9, one for each end of each cylinder.

Any suitable means—as, for example, an india-rubber or other buffer 6—may, if necessary, be provided in each case to take the impact of the water-relief valve 4 or valves $x$ when opened by the water of condensation under the action of the engine piston or pistons. It is, however, preferred to make the steam-chamber above such valve or each of such valves sufficiently long to prevent the valve striking the top of the chamber in which it works.

Although the steam-valve $f$, air-inlet valve $h$, and water-relief valves $x$ or valve 4 are hereinbefore described as working vertically, the valve-casing $a$ may, if desired, be so arranged that they will work horizontally or in an inclined position.

What I claim is—

1. Relief valve apparatus for locomotive and other like engines, comprising a valve-casing having a tubular branch the interior of which forms a vacuum-relief passage, a steam-supply chamber adapted to be connected to a steam-generator, a steam-passage extending from said steam-chamber to said vacuum-relief passage and terminating in a nozzle projecting into said vacuum-relief passage, and an air-inlet passage leading into said vacuum-relief passage and arranged opposite to said steam-inlet passage, a steam-valve located in said steam-chamber, provided with a stem extending through said steam-passage, and adapted to normally close said passage, and an inwardly-opening air-valve that normally closes said air-passage and is provided with an inwardly-extending stem or projection arranged to abut against the stem of said steam-valve and open the same when said air-valve opens, substantially as described for the purpose specified.

2. Relief valve apparatus for locomotive and other like engines, comprising a valve-casing having a vacuum-relief passage adapted to be placed in communication with the steam chest or cylinder or cylinders of an engine of the kind referred to, oppositely-arranged steam and air inlet passages adapted to communicate with said vacuum-relief passage, and a water-relief-valve chamber having one end in communication with the steam-inlet passage, its other end adapted to be placed in communication with an engine-cylinder, and an intermediate part in connection with a water-exit passage, oppositely-arranged steam and air valves controlling said steam and air inlet passages respectively, said steam-valve having an inwardly-extending stem, and said air-valve being made of much larger area than said steam-valve and having a projection or stem adapted on said air-valve opening in an inward direction to abut against the stem of said steam-valve and open the same, and a water-relief valve arranged to work in said chamber and control the exit of water through said water-exit passage, substantially as described for the purpose specified.

3. Relief valve apparatus for locomotive and other like engines, comprising a valve-casing having a tubular branch the interior of which forms a vacuum-relief passage, a steam-supply chamber adapted to be connected to a steam-generator, a steam-passage extending from said steam-chamber to said vacuum-relief passage, an air-inlet passage leading into said vacuum-relief passage and arranged opposite to said steam-inlet passage, water-exit passages the outer ends of which are adapted to be connected to an engine cylinder or cylinders, cylindrical valve-chambers each having one end in permanent communication with said steam-chamber and its other end adapted to communicate with one of said water-exit passages and having its wall between its ends formed with a water-exit port or passage, a steam-valve located in said steam-chamber, provided with a stem extending through said steam-passage, and adapted to normally close said passage, an inwardly-opening air-valve that normally closes said air-passage and is provided with an inwardly-extending stem or projection arranged to abut against the stem of said steam-valve and open the same when said air-valve opens, and water-relief valves arranged within said cylindrical chambers and normally bearing against annular seats that surround the inner ends of said water-exit passages and the inner diameter of each of which is of less diameter than the corresponding water-relief valve, substantially as described for the purposes specified.

4. Relief valve apparatus for locomotive and other like engines, comprising a valve-casing $a$ having a tubular branch $a'$, a steam-chamber $b$ adapted to be connected to a steam-pipe, a steam-passage $e'$ extending from said steam-chamber, arranged at right angles to said tubular branch $a'$, and provided with a steam-delivery nozzle $e^2$ arranged to deliver into said tubular branch, a stationary guide $k$, and an air-passage $g$ through its lower part, a steam-valve $f$ located in said steam-chamber and adapted to bear against an annular seat around the inlet end of said steam-passage $e$, a stem $m$ attached to said valve and extending through said steam-passage and into said guide, a bush $n$ fixed in said air-inlet passage $g$, and an air-inlet valve $h$ adapted to seat itself against the annular inner end of said bush and provided with a projection $i$ arranged to work in said guide and to abut against the adjacent end of said valve-stem when the air-valve opens, substantially as described for the purpose specified.

5. Relief valve apparatus for locomotive and other like engines, comprising a valve-casing $a$ having a tubular branch $a'$, a steam-chamber $b$ adapted to be connected to a steam-pipe, a steam-passage $e'$ extending from said steam-chamber, arranged at right angles to said tubular branch $a'$, and provided with a steam-delivery nozzle $e^2$ arranged to deliver into said tubular branch, a stationary guide $k$, an air-passage $g$ through its lower part, water-exit passages $r$ the outer ends of which are adapted to be connected to pipes $t$ and the inner ends of which are surrounded by annular valve-seats $y$, cylindrical water-relief-valve chambers $p$ located above said valve-seats $y$, passages $q$ connecting the upper ends of said chambers to said steam-chamber $b$, and a water-delivery spout in communication with said chambers $p$ through ports $v$ located between the ends of said chambers, a steam-valve $f$ adapted to control said steam-passage, a stem $m$ attached to said steam-valve, an air-valve $h$ adapted to control said air-inlet passage $g$ and provided with a projection $i$, and cylindrical water-relief valves $x$ arranged to work in said chambers $p$ and to normally bear against said seats $y$, substantially as described for the purpose specified.

Signed at 77 Cornhill, London, England, this 13th day of September, 1901.

ALEXANDER SPENCER.

Witnesses:
  PERCY E. MATTOCKS,
  HUGH HUGHES.